INVENTOR.
MORRIS C. JONES, JR.

INVENTOR.
MORRIS C. JONES, JR.
BY
ATTORNEYS

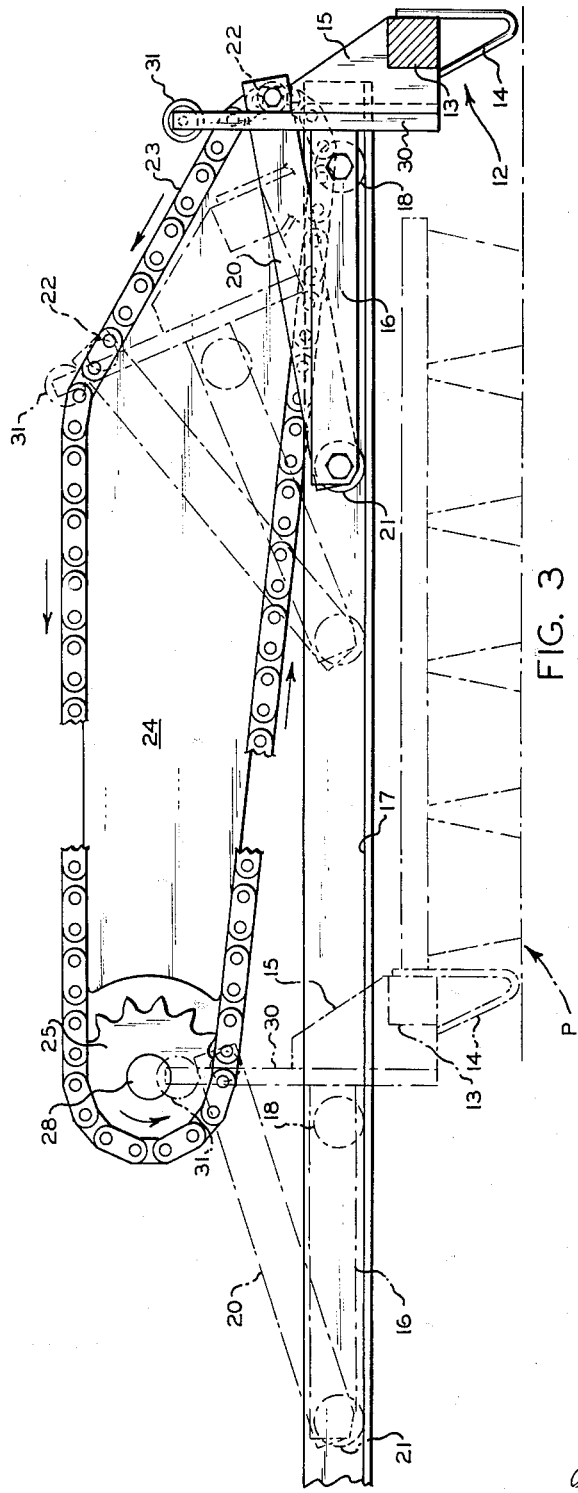
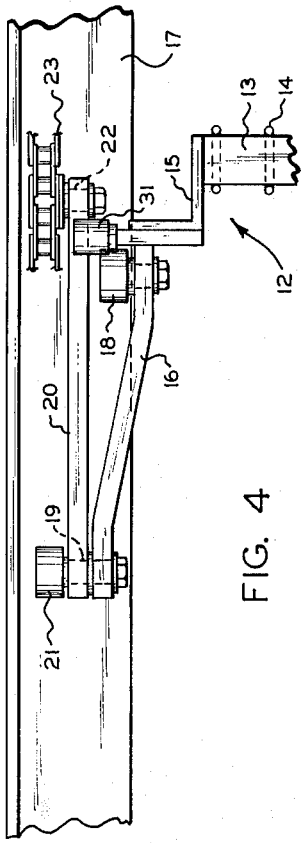
FIG. 3
FIG. 4

Aug. 24, 1965  M. C. JONES, JR  3,202,262
RECIPROCATING PUSHER TRANSFER APPARATUS
Filed March 28, 1963  4 Sheets-Sheet 4

INVENTOR.
MORRIS C. JONES, JR.
BY
ATTORNEYS

United States Patent Office 3,202,262
Patented Aug. 24, 1965

3,202,262
RECIPROCATING PUSHER TRANSFER
APPARATUS
Morris C. Jones, Jr., Saginaw, Mich., assignor to Baker Perkins Inc., Saginaw, Mich., a corporation of New York
Filed Mar. 28, 1963, Ser. No. 268,758
9 Claims. (Cl. 198—24)

This invention relates to transfer apparatus and more particularly to apparatus especially adapted for use in transferring farinaceous products from one conveyor to another in such manner as to minimize the possibility of damaging the conveyed products by subjecting the latter to sudden changes in speed of movement.

In transferring such products from one position to another, there are instances where the articles must be handled exceedingly gently if they are not to be injured during transfer. For example, particularly the transfer of proofed dough pieces to an oven, and to some degree the transfer of baked products from an oven, must be accomplished without jars or shocks attendant rapid acceleration and deceleration if the dough pieces or baked products are not to be collapsed or damaged. In this connection, however, it is important that the transfer of such products be accomplished in synchronism with the other operations of an automated material handling system so as to enable the entire system to operate at as rapid a speed as possible.

An object of this invention is to provide article transfer apparatus which is capable of effecting transfer of an article from a first position to a second position and in which the transfer begins slowly, then accelerates, and subsequently decelerates so as to gently to initiate and terminate the transfer movements of the article.

Another object of the invention is to provide transfer apparatus of the character described which is reciprocable across the path of articles delivered to the transfer zone and which is shiftable between operative and inoperative positions so as to avoid contact with oncoming articles except when the articles are in position to be transferred.

A further object of the invention is to provide transfer apparatus of the character described and in which the shifting of the article engaging means is effected without requiring the operating means to bear the full weight of the article engaging means.

Another object of the invention is to provide transfer apparatus which is operable to effect disengagement between the article engaging means and the article or product transferred thereby in such manner as to avoid any possibility of tipping the transferred article upon shifting of the article engaging means.

Other objects and advantages of the invention will be pointed out specifically or will become apparent from the following description when it is considered in conjunction with the appended claims and the accompanying drawings, in which:

FIGURE 3 is an enlarged, side elevational view of a portion of the apparatus shown in FIGURE 2 with the loader bar shown in forward position, the chain lines indicating various positions of the loader bar and associated parts;

FIGURE 4 is a fragmentary, top plan view of a portion of the structure disclosed in FIGURE 3;

Figure 1:
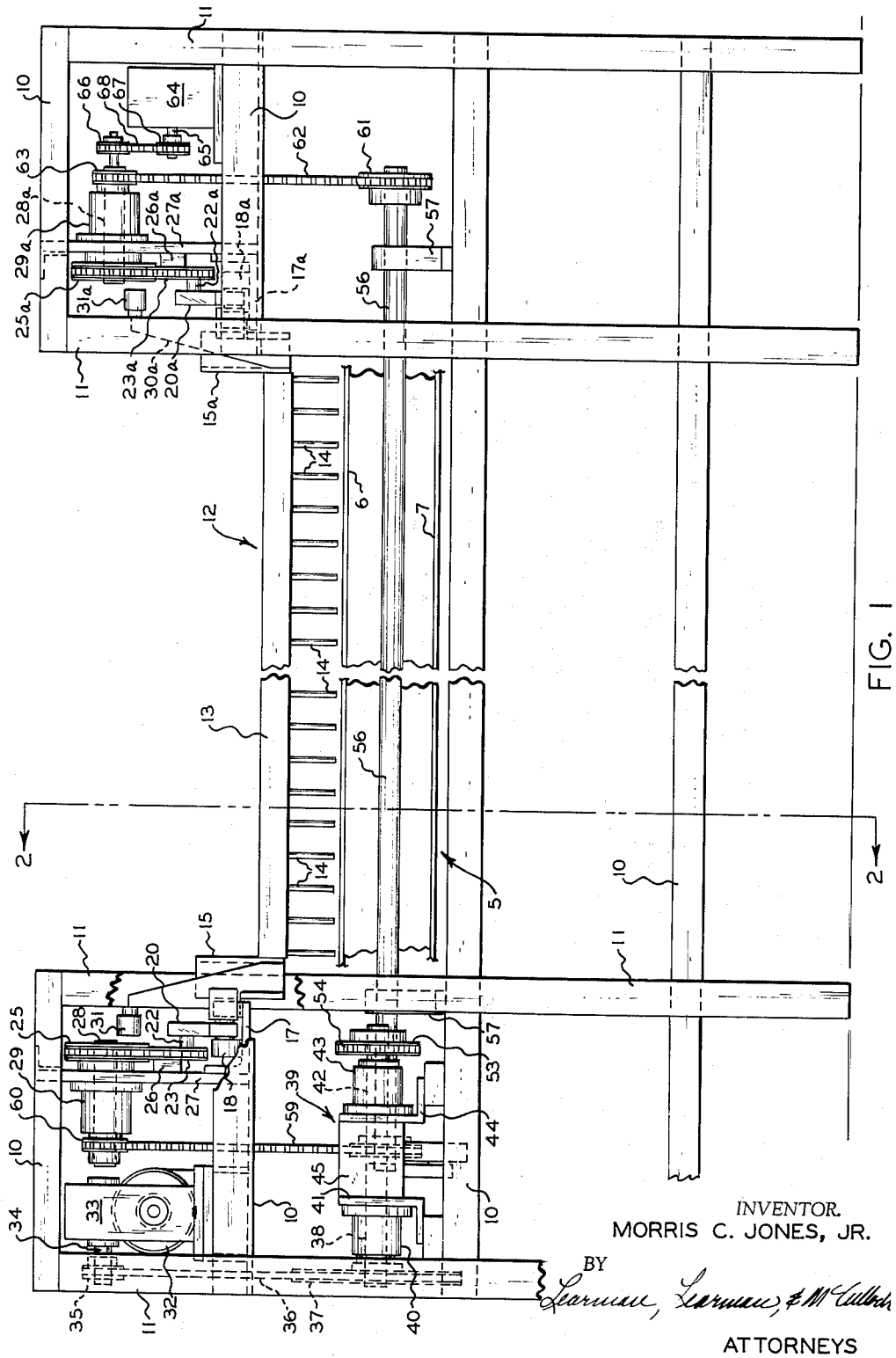
FIGURE 1 is a fragmentary, end elevational view of transfer apparatus constructed in accordance with the invention.
Figure 2:
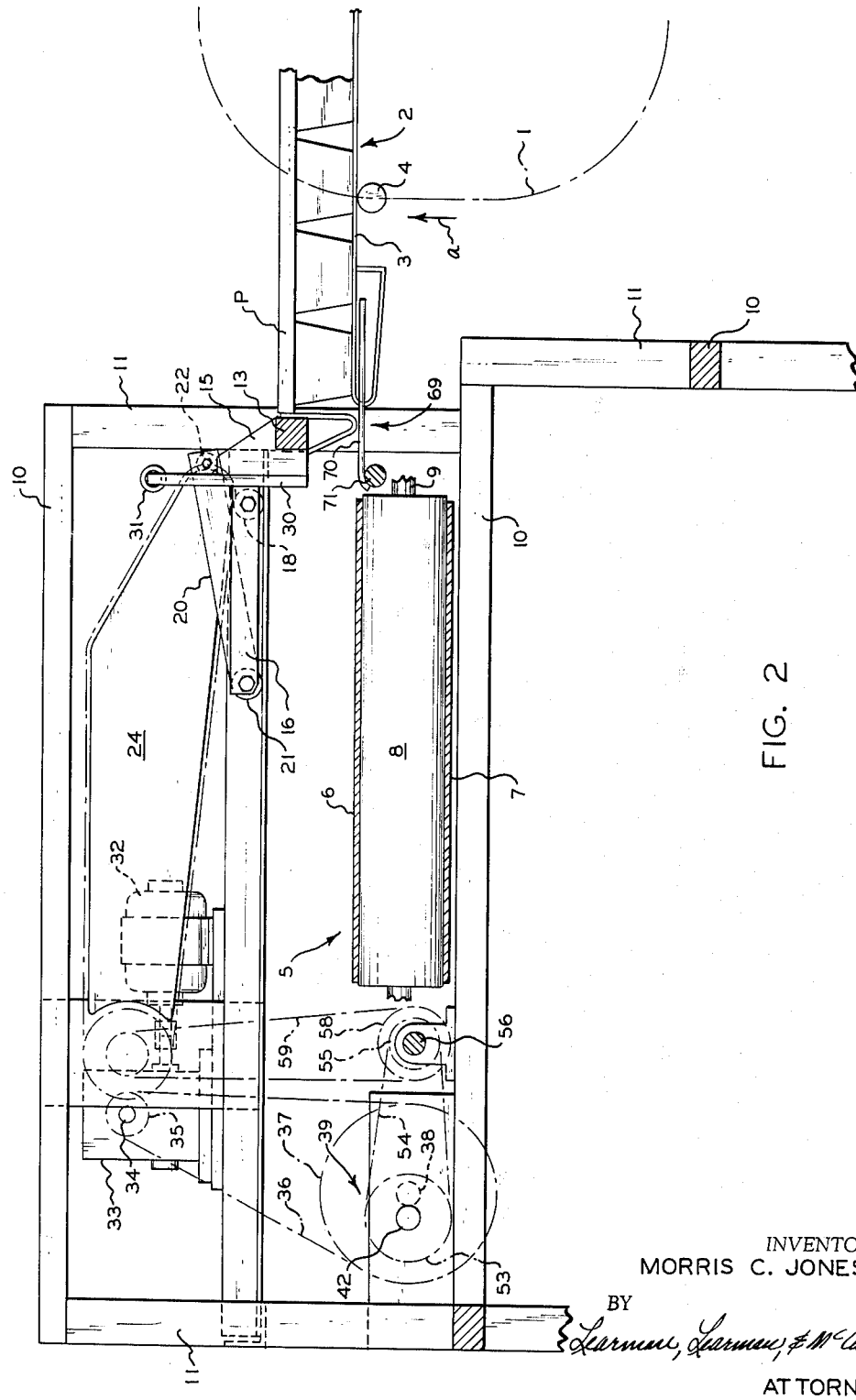
FIGURE 2 is a transverse sectional view taken on the line 2—2 of FIGURE 1.

Apparatus constructed in accordance with the invention is disclosed as being conditioned for use in conjunction with a baking oven or the like including an endless oven conveyor 1 having a vertically moving run that is driven in the direction of the arrow $a$ (FIGURE 2) and on which is mounted a number of trays, one of which is shown at 2. Each of the trays 2 includes a plurality of spaced apart rods 3 that are joined to one another by a transverse member 4 as is conventional to form a pan support surface.

The transfer apparatus also is disclosed as being adapted for operation in conjunction with an endless conveyor belt 5 having upper and lower runs 6 and 7, respectively, trained around rollers 8 that are driven in a direction to enable articles such as pans P supported on the upper run 6 of the conveyor to be delivered to a transfer station or zone adjacent the path of movement of the trays 2.

The transfer apparatus comprises a plurality of horizontal and vertical frame members 10 and 11, respectively, that are welded or otherwise suitably secured one to another to form a supporting framework which straddles the delivery conveyor 5. A carriage member 12 is reciprocably mounted at the transfer zone by the supporting framework for reciprocating movements toward and away from the oven conveyor 1 to transfer products from the delivery conveyor 5 to the trays 2 in timed relation to the movement of the latter.

The carriage member 12 includes a bar 13 to which is secured a plurality of spaced apart, dependent article engaging fingers 14 that project toward the upper run 6 of the conveyor 5. At one end of the bar 13 is a mounting member 15 to which is secured a rearwardly extending arm 16. The arm 16 is bent between its ends (see FIGURE 4) in such manner that the end remote from the member 15 projects laterally beyond the latter to overlie a guide rail 17 that is supported by the supporting framework. Adjacent the member 15 the arm 16 is provided with a roller 18 that is adapted to ride upon the upper surface of the guide rail 17. Adjacent its other end the arm 16 is pivoted by a pin 19 to one end of a link 20, the shaft 19 also journaling a roller 21 which rides upon the guide rail 17. The opposite end of the link 20 is pivoted by means of a pin 22 to a link of a conventional, endless chain 23 having upper and lower runs trained around a guide shoe or plate 24 and around a driven sprocket wheel 25. The plate 24 is mounted by means of brackets 26 on a support 27 that is carried by the main frame, and the sprocket wheel 25 is fixed to a shaft 28 that is journaled in bearings 29 supported by the member 27. The sprocket wheel 25 is driven by means yet to be described in such direction as to cause the chain 23 to move in the direction of the arrows shown in FIGURE 3.

The construction and arrangement of the carriage parts described thus far are such that the end of the link 20 that is pivoted to the chain 23 moves with the latter about its orbital path. As this end of the link 20 moves from the lower run of the chain to the upper run, the link rocks about its pivotal connection to the carriage arm 19 and moves relatively to the latter. Welded or otherwise suitably fixed to one end of the carriage member 15 is an upstanding bracket 30 at the upper end of which is mounted an abutment 31 that is so located as to lie in the path of swinging movement of the link 20. The purpose of the abutment 31 which takes the form of a roller will be explained hereinafter.

The carriage assembly 12 includes apparatus at its opposite end corresponding to the apparatus just described and similar parts are identified by similar reference characters, followed by the suffix *a*.

Means is provided for driving the driven chains 23, 23*a* and comprises a constant speed prime mover or electric motor 32 supported on one of the frame members 10 and having its armature shaft coupled to the input shaft of a conventional speed reduction unit 33 that also is supported on the main frame. The speed reducer 33 includes an output shaft 34 on which is fixed a sprocket wheel 35 around which is trained a sprocket chain 36. The chain 36 also is trained around a sprocket wheel 37 that is fixed to a shaft 38 forming part of a variable speed drive transmission mechanism 39.

The drive transmitting mechanism 39 includes a bearing housing 40 in which the shaft 38 is rotatably journaled, the housing 40 being bolted or otherwise secured to a mounting bracket 41 that is supported on the main frame. The mechanism 39 also includes a driven shaft 42 journaled in a bearing housing 43 that is similarly fixed to a mounting bracket 44 which also is supported on the main frame. For purposes of stability, the mounting brackets 41 and 44 may be joined to one another by spacer members 45.

Figure 6:
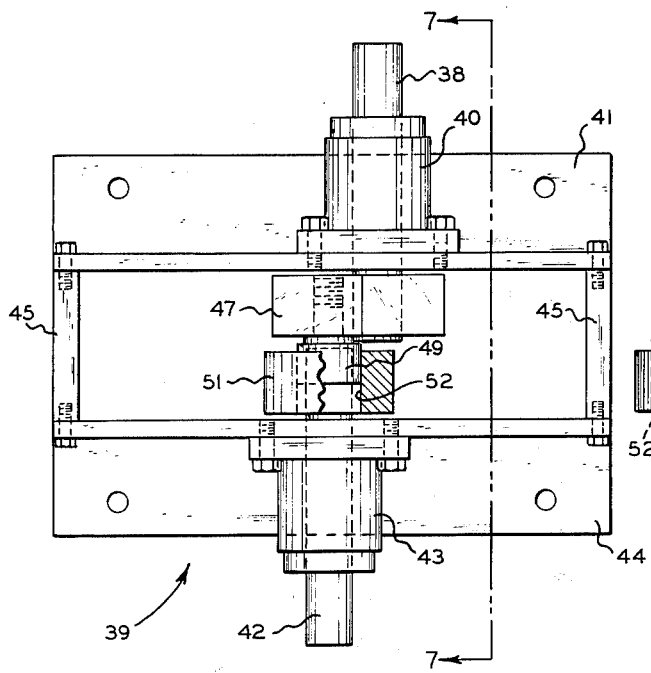
FIGURE 6 is a fragmentary, top plan view of the apparatus shown in FIGURE 5.
Figure 7:
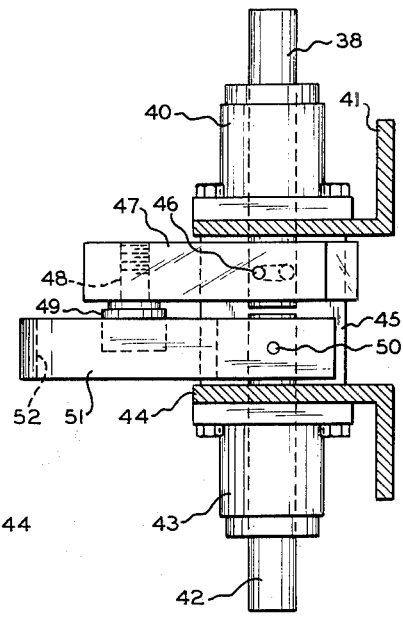
FIGURE 7 is a sectional view taken on the line 7—7 of FIGURE 6.
Figure 5:
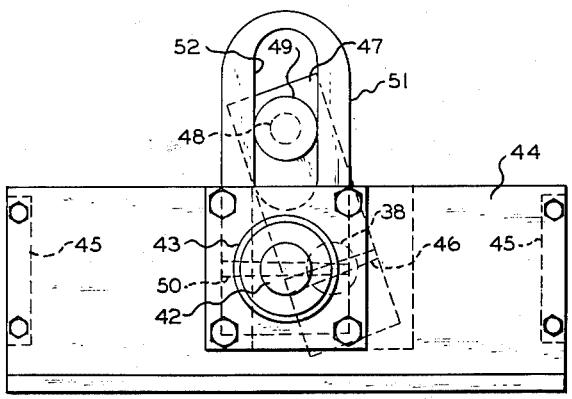
FIGURE 5 is a side elevational view of a portion of drive transmission means forming part of the invention.

As is best shown in FIGURES 6 and 7, the driving shaft 38 and the driven shaft 42 of the drive transmitting mechanism are mounted at the same level and with their longitudinal axes parallel, but nonaligned with one another, and the confronting ends of the shafts 38 and 42 extend toward and are slightly spaced from one another. Fixed on the shaft 38 by a pin 46 or the like is a crank arm 47 having a threaded shaft 48 secured adjacent its outer end on which is journaled a guide projection or roller 49. Fixed on the driven shaft 42 by means of a pin 50 or the like is a link 51 having a longitudinally extending lost motion slot 52 formed therein and in which the projecting roller 49 is received.

The construction and arrangement of the drive transmitting mechanism 39 are such that the driving projection or roller 49 rotates in an orbital path which is eccentric with respect to the axis of rotation of the driven shaft 42. Thus, as the shaft 38 rotates, the drive projection 49 will cause rotation of the link 50 and, as the latter rotates, the projection 49 will move radially inwardly and outwardly in the slot 52. As the drive projection 49 moves radially outwardly, the speed of rotation of the driven shaft 42 will decelerate and when the projection 49 moves radially inwardly the speed of the shaft 42 will accelerate. Accordingly, rotation of the driving shaft 38 at a uniform speed will effect variable speed rotation of the driven shaft 42.

Fixed to the free end of the driven shaft 42 is a sprocket wheel 53 around which is trained a chain 54. The chain 54 also is trained around a sprocket wheel 55 that is fixed to a shaft 56 journaled in bearings 57 supported on the main frame. Adjacent one end of the shaft 56 is fixed a sprocket wheel 58 around which is trained a chain 59, the chain 59 also being trained around a sprocket wheel 60 that is fixed to the shaft 28 that drives the chain 23. At the opposite end of the shaft 56 is fixed another sprocket wheel 61 around which is trained a chain 62, the latter also being trained around a sprocket wheel 63 which is fixed to the shaft 28*a* that drives the chain 23*a*. The arrangement is such that the two chains 23 and 23*a* are driven simultaneously and at the same speed.

The driving motor 32 may be operated continuously, if desired, or it may be operated intermittently to effect one cycle of operation of the transfer apparatus. One cycle of operation of the transfer apparatus requires two revolutions of the driving and driven shafts 38 and 42. If cyclical operation is desired, starting and stopping of the motor may be effected by conventional switches mounted in a "Gemco" cam box 64 that is supported on the main frame and having switch operating cams mounted on a shaft 65 that is driven from the shaft 28*a* by suitable sprockets 66 and 67 fixed on the shafts 28*a* and 65, respectively, and rotated by a chain 68.

When the apparatus is conditioned for operation, articles such as the pans P are delivered in succession by the delivery conveyor 5 to the transfer zone. As each set of pans arrives at the transfer zone, the carriage member 12 will be in a position to engage the pans and push them forwardly off the conveyor 5 and onto a tray 2 or other support. This position of the carriage 12 is indicated in chain lines at the left hand end of FIGURE 3.

If the pans P contain proofed dough or freshly baked products, it is important that the initial engagement and acceleration of the pans by the transfer apparatus be relatively slow and gentle so as to minimize the risk of causing the dough or baked products to collapse. Consequently, the relative positions of the driving and driven shafts of the drive transmitting mechanism 39 should be such that the driving projection 49 is located adjacent the radially outer end of the link 51 upon initiating the forward stroke of the transfer carriage. Once the pans have been set in motion, continued operation of the driving shaft 38 will effect radially inward movement of the driving projection 49 relative to the link 51 so as progressively to increase the speed of rotation of the driven shaft 42 and consequently the speed of forward movement of the transfer carriage to a maximum.

Forward movement of the transfer carriage proceeds along the horizontal path defined by the guide rails 17 and 17*a* so as to cause the pans to be transferred from the upper run 6 of the delivery conveyor 5 toward the oven tray 2 and in timed relation to the arrival of the latter at the transfer zone. To assure smooth delivery of the pans to the oven trays, the space between the delivery conveyor and the trays may be bridged by a shelf 69 located at the transfer zone and comprising spaced apart wire rods 70 supported on a member 71 mounted on the main frame, the spacing of the wires 70 being such as to permit them to be received between adjacent rods 3 forming the tray 2.

As the transfer carriage reaches a zone between its starting and stopping positions and approaches the end of its forward stroke, the driving and driven shafts 38 and 42, respectively, will have been rotated to such positions that the driving projection 49 will be moving radially outwardly relatively to the link 51 so as to effect a reduction in the speed of forward movement of the transfer carriage. Thus, the speed of movement of the pans is decelerated gently as they are deposited on the oven tray.

As the transfer carriage reaches the end of its forward stroke, indicated in full lines in FIGURE 3, its movement ceases momentarily as the forward ends of the links 20, 20*a* move relatively to the carriage 12 from the lower runs of the respective chains 23, 23*a* to the upper runs. As the forward ends of the links reach the turning point in moving from the lower to the upper runs, further movement of the chains causes the carriage to move rearwardly a short distance so as to effect disengagement between the article engaging fingers 14 and the transferred pans. Further movement of the links 20, 20*a* along the upper runs of the chains effects engagement between the links and the respective abutments 31, 31*a*, thereby rocking the carriage 12 counterclockwisely, as viewed in FIGURE 3, about the rollers 21, 21*a* to shift the article engaging fingers 14 to a level higher than the height of the pans P so as to avoid interference with oncoming pans being delivered to the transfer zone. This position of the transfer carriage is indicated in chain lines adjacent the right hand end of FIGURE 3.

Further driving movement of the chains 23, 23*a* will drive the links 20, 20*a* rearwardly to cause the carriage to be returned to its initial position with the carriage supported in an elevated position partly by the links 20, 20*a* and partly by the rollers 21, 21*a*, the latter relieving the chains of a good portion of the weight of the carriage. When the forward ends of the links reach the end of the upper runs of the chains, they move from the upper runs to the lower runs. As this movement takes place, the abutments 31, 31a also are lowered so as to permit rocking movement of the carriage downwardly until the rollers 18, 18a once again rest upon the respective guide rails 17, 17a. At this time the driving projection 49 once again is at the radially outer end of the link 51, and the apparatus is in condition for another cycle of operation. The mechanism is designed to accomplish the loading operation with maximum speed while still providing a gentle engagement and disengagement at the ends of the generally reciprocal path of travel of the loader.

The disclosed embodiment is representative of a presently preferred form of the invention, but is intended to be illustrative rather than definitive thereof. It is to be understood that various changes may be made in the various elements to achieve like results without departing from the spirit of the invention or the scope of the appended claims.

I claim:

1. Transfer apparatus comprising guide means defining a substantially horizontal path; a loader carriage member having article engaging means movable forwardly along said path from a first position to a second position; means on said carriage member rockably supporting the latter on said guide means; an endless driven member movable in a continuous orbital path having forward and reverse runs above said article engaging means; link means connected to said means rockably supporting the carriage member and to said endless member for movement about said orbital path; support post means extending upwardly from said article engaging means and rigidly connected to said article engaging means forwardly of said means rockably supporting the carriage member; abutment means on said support post means above said endless member and engageable with said link means upon movement of the latter to said reverse run to rock said carriage member about said supporting means; and means for driving said driven member.

2. Transfer apparatus for carefully handling dough products and the like comprising; support surface means for the products defining a pathway; article engaging pusher means movable forwardly along a substantial length path from a first position at which the article on said support surface means is engaged to a second position at which the article is disengaged; an endless driven member, generally coextensive with said pathway, and having end runs with curvilinear portions connected by intermediate upper and lower longitudinally extending runs; link means connecting said endless member with said pusher means to move said pusher means from said first to second positions; said end runs being in juxtaposed relation with said pathway, generally disposed near said first and second positions so that movement of the pusher means is somewhat slower at said first and second positions when the link means is passing around said end runs than when the link means is being moved along the longitudinally extending runs; and drive means for said endless member including a drive part and a driven part connected to said endless member, said drive means incorporating transmission means connecting said drive part and driven part timed to move said driven part at a slower rate of speed when said link means is substantially at the end runs of the endless member and at a faster speed when the link means is moving intermediately between the end runs.

3. The apparatus set forth in claim 2 wherein said drive part includes a rotatable driving shaft and said driven part includes a rotatable driven shaft substantially parallel to but nonaligned therewith.

4. The combination defined in claim 2 in which the transmission means comprises a lost motion connection.

5. The apparatus set forth in claim 4 wherein said lost motion connection comprises a crank on one of said shafts and a link on the other of said shafts, and a projection on said crank slideably connected to said link.

6. The combination defined in claim 2 in which said transmission means constitutes varying length crank arm means.

7. The combination defined in claim 2 in which the drive part and driven part comprise longitudinally offset, substantially parallel shafts and said transmission means comprises a crank arm with a vertical slot and a link with a guide received in the slot.

8. Transfer apparatus for carefully handling dough products and the like comprising; support surface means for the products defining a pathway; product engaging pusher means movable forwardly along a substantial length path from a first position at which the product on said support surface means is engaged to a second position at which the product is disengaged; endless driven means, generally coextensive with said pathway, and having front and rear end runs with curvilinear portions, the end runs being connected with intermediate upper and lower generally longitudinally extending runs; link means connecting said endless means with said pusher means to move said pusher means from said first to second positions; said end runs being in juxtaposed relation with said pathway, generally disposed near said first and second positions so that movement of the pusher means is slowed when the link means is passing around said end runs; and drive means for said endless means incorporating speed varying means timed to move said endless means at a slower rate of speed when said link means is substantially at the forward end run of the endless means and at a faster speed when the link means is moving intermediately between the end runs.

9. The combination defined in claim 8 in which means is provided for raising said pusher means when said link means is returning from the rear end run to the front end run.

References Cited by the Examiner

UNITED STATES PATENTS 1,115,000  10/14  Martin _____ 74—69
2,980,038   4/61  Roger _____ 198—24

OTHER REFERENCES

Product Engineering, vol. No. XXI, issue 7, pages 136, 137, 138, July 1950.

SAMUEL F. COLEMAN, *Primary Examiner.*

WILLIAM B. LABORDE, *Examiner.*